United States Patent
McConnell

(10) Patent No.: US 6,418,306 B1
(45) Date of Patent: Jul. 9, 2002

(54) COMMON MESSAGE WAITING NOTIFICATION ACROSS LANDLINE AND WIRELESS TELECOMMUNICATIONS NETWORKS

(75) Inventor: Von McConnell, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/357,012

(22) Filed: Jul. 19, 1999

(51) Int. Cl.⁷ .............................................. H04M 11/10
(52) U.S. Cl. ........................ 455/413; 455/417; 455/445; 379/88.12
(58) Field of Search ................................. 455/412, 413, 455/414, 417, 445; 379/93.24, 100.04, 93.26, 93.27, 88.12, 88.18, 88.23, 88.25

(56) References Cited

U.S. PATENT DOCUMENTS

| | | |
|---|---|---|
| 4,191,860 A | 3/1980 | Weber |
| 5,177,780 A * | 1/1993 | Kasper et al. .............. 455/413 |
| 5,247,571 A | 9/1993 | Kay et al. |
| 5,303,285 A | 4/1994 | Kerihuel et al. |
| 5,353,331 A | 10/1994 | Emery et al. |
| 5,694,463 A | 12/1997 | Christie et al. |
| 5,742,905 A * | 4/1998 | Pepe et al. ................... 455/461 |
| 6,002,750 A * | 12/1999 | Ertz ......................... 379/88.12 |
| 6,014,559 A * | 1/2000 | Amin ......................... 455/413 |
| 6,061,718 A * | 5/2000 | Nelson ....................... 709/206 |
| 6,208,854 B1 * | 3/2001 | Roberts et al. ............. 455/417 |

* cited by examiner

Primary Examiner—Edward F. Urban
Assistant Examiner—Temica M. Davis
(74) Attorney, Agent, or Firm—Harley R. Ball; Steven J. Funk; Kevin D. Robb

(57) ABSTRACT

A method of notifying a user of two or more networks (10, 12) that the user has received a message in a messaging system (28, 58) or that a message has been deleted. The method notifies all phones (30, 54) operated by the user on all of the networks. The method also forwards calls directed to a user to a single messaging system that may reside on any network, regardless which of the user's phones a caller dials. The invention permits a user to be notified of the receipt or deletion of a message at all of the user's phones and provides messaging services on all of a user's phones with a single messaging system.

21 Claims, 4 Drawing Sheets

COMMON MESSAGE WAITING NOTIFICATION ACROSS LANDLINE AND WIRELESS TELECOMMUNICATIONS NETWORKS

BACKGROUND OF THE INVENTION

1. Field of the Invention

The present invention relates to telecommunications, and more particularly, to a method of notifying telephone users of the receipt and/or deletion of messages in voicemail or other messaging systems.

2. Description of the Prior Art

Many persons use one or more landline phones at work and/or home and a wireless phone while they are away from their landline phones. It is also common for persons to have voicemail or other messaging systems coupled with each of their phones so that they can receive messages regardless of which one of their phones callers dial.

The use of more than one messaging system currently causes problems, however, because a person who receives a message on a landline messaging system will not be notified of the receipt of the message while he or she is operating a wireless phone or other landline phone, and vice versa. With current systems, the person will only be notified of the receipt of a message associated with a particular phone once he or she returns to that phone, resulting in the late receipt of some messages. The use of multiple messaging systems is also expensive and a waste of telecommunications resources.

SUMMARY OF THE INVENTION

The present invention solves the above-described problems and provides a distinct advance in the art of messaging systems for telecommunications networks and other networks. More particularly, the present invention provides a method of notifying a user of two or more networks that the user has received a voicemail or other message, regardless of which network the user is currently operating. The invention also provides a method of forwarding all calls or communications directed to a user to a single messaging system that may reside on any network, regardless of which of the user's phones a caller dials.

The present invention provides numerous benefits not found in prior art telecommunications systems. For example, the invention permits a user to be nearly immediately notified of the receipt or deletion of a message in the user's voicemail regardless of which phone the user is operating and where the user is located, thus allowing the user to retrieve messages more quickly. The invention also provides messaging services to a plurality of landline and wireless phones with a single messaging system, thus eliminating the need to procure multiple messaging systems for a single telephone user and the costs associated therewith.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

System Architecture

Figure 1:
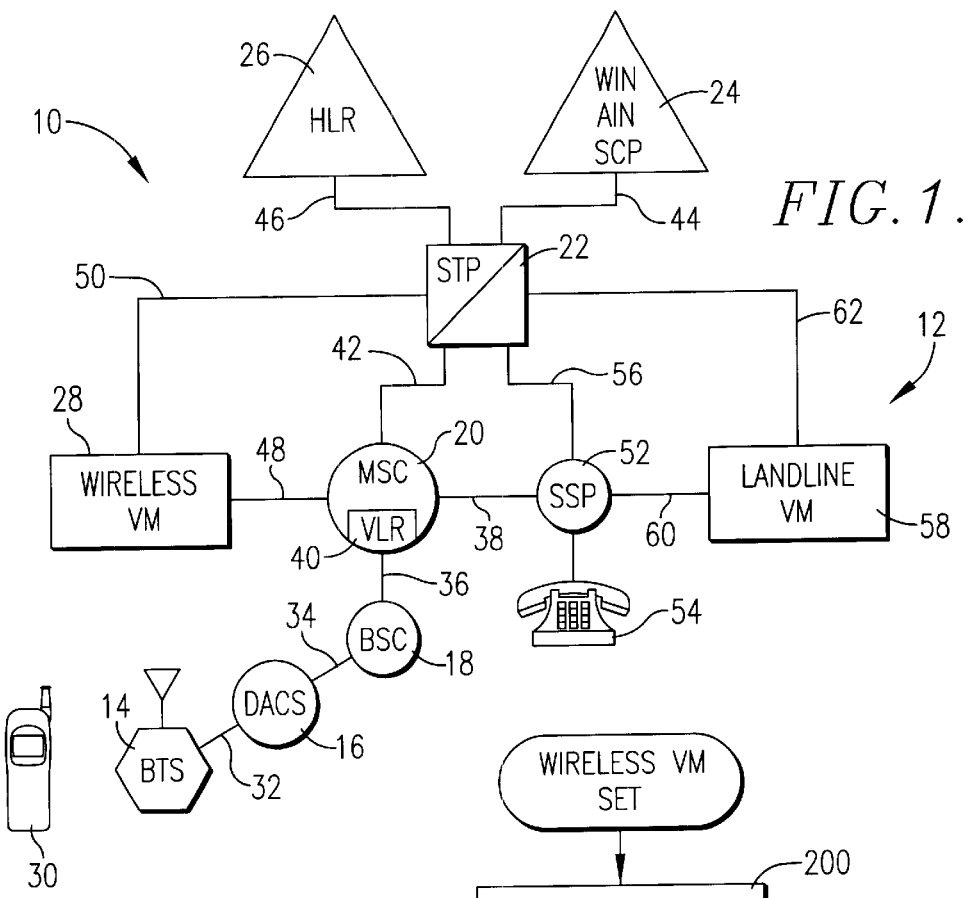
FIG. 1 is a schematic diagram of a wireless telecommunications network and a landline telecommunications network that may be used to implement a preferred embodiment of the present invention.

Turning now to the drawing figures, FIG. 1 illustrates an exemplary wireless telecommunications network 10 and a public switched telephone network (PSTN) 12 that may be used to implement a preferred embodiment of the present invention. The steps of the present invention may be implemented in any two or more networks where messages are received and stored for later retrieval by a user including, but not limited to, landline telecommunications networks, wireless telecommunications networks, local area networks, wide area networks, intranets, and internets. The illustrated architecture is shown for purposes of disclosing a preferred embodiment of the invention and can be modified as a matter of design choice.

The wireless network 10 is preferably a code division multiple access (CDMA) PCS wireless intelligent network such as the PCS network owned and operated by Sprint PCS. The wireless network broadly includes a base station (BTS) 14, a digital access and cross-connect system (DACS) 16, a base station controller (BSC) 18, a mobile switching center (MSC) 20, a signal transfer point (STP) 22, a service control point (SCP) 24, a home location register (HLR) 26, and a wireless messaging system 28, all interconnected by signaling data links and trunk circuits as described below.

The BTS 14, which is well known in the art, provides wireless communications to and from mobile stations such as PCS or AMPS phones 30 or other wireless devices in a telecommunications cell. The BTS includes a plurality of transceivers coupled with one or more antennas that together provide wireless communications within the cell, which is preferably subdivided into three sectors. The cell is preferably part of a CDMA PCS telecommunications network such as the Sprint PCS network described above. The preferred BTS is operable to control transmission and reception of CDMA PCS traffic independently in the three sectors using selected ones of a defined set of codes for each sector. The codes may include, for example, Walsh codes. An example of a BTS that may be used with the present invention is the Nortel CDMA Outdoor 1900 MHZ base station. Those skilled in the art will appreciate that the wireless network may include numerous BTSs positioned in telecommunications cells throughout the country.

The DACS 16, which is coupled with the BTS 14 with signaling data links and trunk circuits 32, is a digital switching device that is operable for routing and switching control messages between the BTS and the other components in the wireless network. Additional DACS may be positioned at other concentration points in the network.

The BSC 18 is coupled with the DACS 16 with signaling data links and trunk circuits 34 and is operable to control operation of the DACS and the BTS. The BSC is basically a high-capacity switch that provides total overview and control of wireless functions supported by the network 10 such as call handover control, cell configuration management, and BTS and mobile phone power level management. The BSC multiplexes signals from multiple BTSs into transmission signals that are sent to the MSC 20. The BSC also routes network signals and calls from other components of the wireless network to the appropriate BTS for transmission to the mobile stations.

The MSC 20 is coupled with the BSC 18 and other base station controllers with signaling data links and trunk circuits 36 and is operable to coordinate the establishment of calls to and from the mobile stations and to handle transmission facilities management, mobility management, and call processing. The MSC is also connected with the PSTN by signaling data links and trunk circuits 38 to provide switching between the wireless network and the PSTN.

The MSC 20 either includes an integrated visitor location register 40 (VLR) or is coupled with a stand-alone VLR. The VLR includes a database that contains information relating to mobile phones that are resident in their home service area, roaming outside of their home service area, or roaming in another wireless network. When a mobile phone is active in any service area, it automatically registers with the base station or mobility controller in that area. The local provider in the service area then queries the HLR 26 through the STP 22 using Signaling System #7 (SS7) or other signaling to retrieve information needed to verify the legitimacy of the mobile phone and to obtain a profile of the features associated with the mobile phone. The HLR responds to the query by transferring the necessary data to the VLR. This information is maintained in the VLR of the MSC as long as the mobile phone remains active within that coverage area. The HLR also updates its own database to indicate the current location of the mobile phone so that it can forward calls to the phone through the local provider in the service area. The querying process in the preferred wireless network is accomplished via SS7 links using the STP and SCP as described below.

The STP 22 is connected between the MSC 20 and the SCP 24 by signaling data links 42, 44 and is operable to route signaling messages therebetween. STPs are well known in the art with an example being the DSC Megahub.

The SCP 24 is coupled with the STP 22 to exchange signaling messages with the MSC 20 and other mobile switching centers and with the PSTN 12 as described below. The SCP includes, or is operable to access, a plurality of databases for providing intelligence and routing information to the wireless network 10 and PSTN 12. In accordance with one aspect of the present invention, the SCP integrates both wireless intelligent network (WIN) and advanced intelligent network (AIN) protocols on a single platform. Specifically, the SCP uses TCAP protocols to perform transaction processing for wireless calls and uses SS7 protocols to perform processing activities for landline calls. Those skilled in the art will appreciate that the SCP may utilize other signaling systems or means to exchange messages.

The use of a single SCP 24 with both WIN and AIN messaging capabilities allows the present invention to map enhanced service profiles between two networks such as the illustrated wireless network 10 and PSTN 12. For example, use of WIN messaging protocols in the SCP permits the wireless network to initiate activities in the PSTN and to trigger or invoke customized message waiting notification announcements or text displays on phones coupled with the PSTN. Similarly, use of AIN protocols in the SCP permit the PSTN to initiate activities in the wireless network and to trigger customized announcements or text displays on phones coupled with the wireless network. The use of a common platform SCP also permits mapping of non-SS7 voicemail into SS7 AIN messaging via Dialnumber and DTMF digit pulsing as described below.

The HLR 26 may be a database residing on the SCP 24 or may be a stand-alone database or service control point coupled with the STP 22 by signaling data links 46 for servicing several SCPs. In either case, the HLR includes a database containing subscriber data and information used to identify a subscriber of the wireless network and subscriber data relating to features and services available to the subscriber. The HLR, which represents the "home" database for subscribers, may, for example, contain a record for each home subscriber that includes location information, subscriber status, subscribed features, and directory numbers. The HLR is used in conjunction with the VLR as described above to support mobility management features to which the user has subscribed when that user is in or roaming outside of his home area.

The wireless messaging system 28 is operable for receiving and storing voicemail or other messages and is coupled with the MSC 20 with signaling data links and trunk circuits 48 and is coupled with the STP with signaling data links 50. The messaging system may be any conventional messaging device such as a voicemail system residing on the PCS wireless intelligent network owned and operated by Sprint PCS.

As is well known in the art, the MSC 20, STP 22, SCP 24, HLR 26, VLR 40, and messaging system 28 all communicate via out of band signaling, typically using IS-41, SS7 or TCP/IP protocols to facilitate the routing of calls through the wireless network 10. The signaling allows the network elements to exchange information to more quickly and efficiently route calls over the network.

The PSTN 12 refers to the entire local, long distance, and international landline phone system used in the United States, which includes well known components such as the illustrated signal switching point (SSP) 52. The SSP is basically a switch, such as those manufactured by Lucent, that can recognize advanced intelligent network calls and route and connect them under the direction of the SCP 24. As illustrated, the SSP serves as a local central office for a plurality of landline phones (only one shown) and is connected with the SCP via the STP 22 with signaling data links 56 to send routing queries to and to receive routing instructions from the SCP. The SSP is also coupled with the MSC 20 with signaling data links and trunk circuits 38 as described above.

The PSTN also includes a landline messaging system 58 operable for receiving and storing voicemail or other messages. The landline messaging system is coupled with the SSP with signaling data links and trunk circuits 60 and with the STP with signaling data links 62. The messaging system may be any conventional messaging device such as a voicemail system.

Operation

The components of the preferred wireless network 10 and PSTN 12 are programmed to perform the message waiting notification steps of the present invention. The software that performs and/or controls the steps is stored on computer-readable memory devices resident on or accessible by the components of the wireless network and PSTN as described in connection with FIGS. 2 through 5 below. The message waiting notification features of the present invention may be implemented with only the wireless messaging system 28, only the landline messaging system 58, or both.

Figure 2:
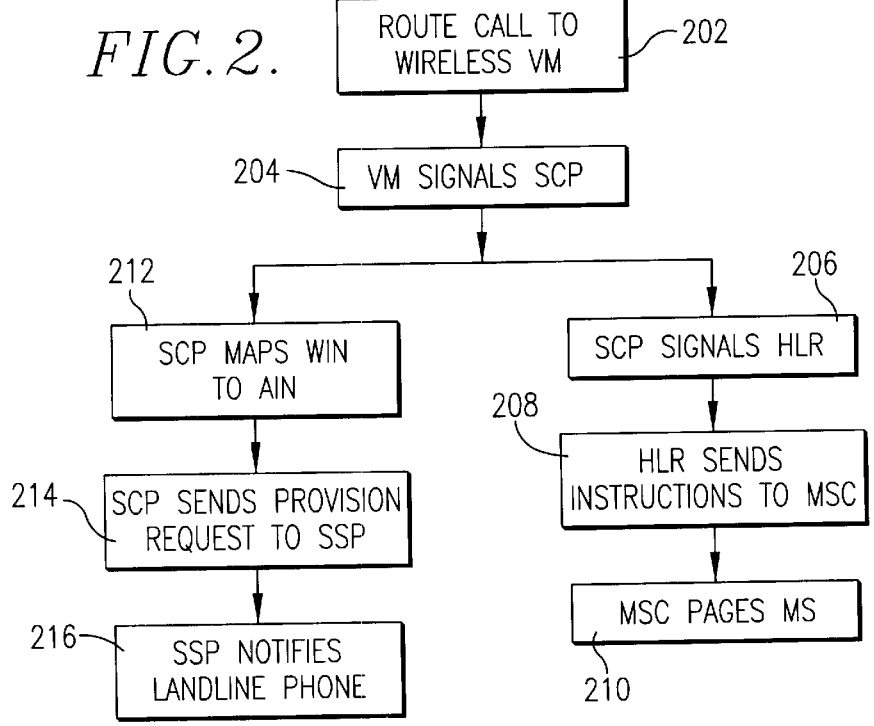
FIG. 2 is a flow diagram broadly illustrating the steps in a preferred embodiment of the present invention to notify a user when a message has been received in the user's wireless messaging system.
Figure 3:
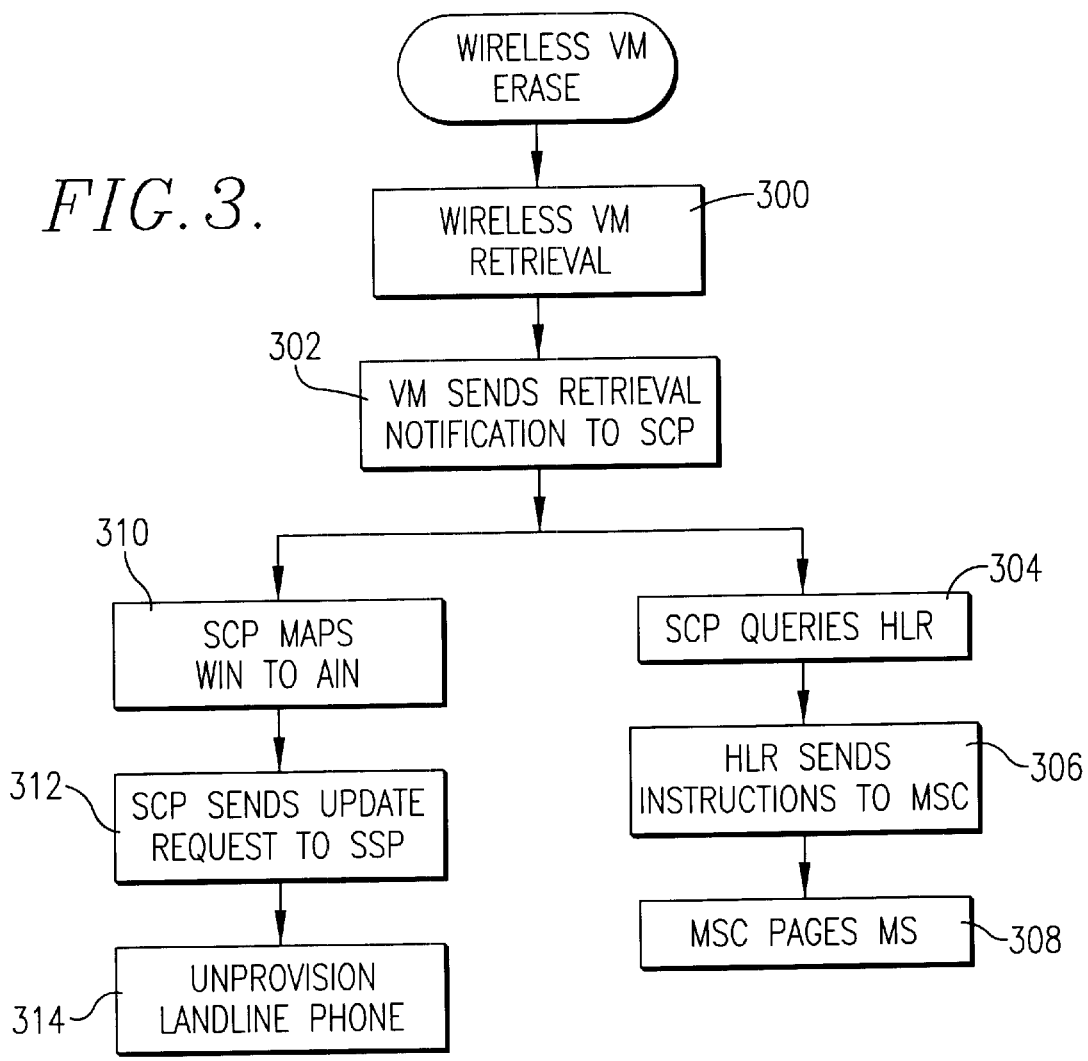
FIG. 3 is a flow diagram broadly illustrating the steps in a preferred embodiment of the present invention to notify a user when a message has been retrieved and/or erased from the user's wireless messaging system.

FIGS. 2 and 3 broadly illustrate the steps in a scenario where it is desired to have the wireless voicemail 28 receive and store all messages directed to a telephone user who subscribes to telephone services from both the wireless network 10 and the PSTN 12. In other words, the wireless voicemail will receive all messages directed to both the user's mobile phone 30 and landline phone 54. To provide message waiting notification to both phones in this scenario, call forwarding (CF) values are first set for the phones as depicted in step 200 of FIG. 2. Specifically, the HLR 26, SCP 24 or SSP 52 is programmed so that calls directed to the landline phone will be forwarded to the wireless voicemail if the landline phone is busy or unanswered after a predetermined number of rings. Similarly, the HLR or WIN SCP is programmed so that all calls directed to the mobile phone will be forwarded to the wireless voicemail if the mobile phone is busy or unanswered after a predetermined number of rings.

After the call forwarding values have been set, an incoming call directed to the user at either the mobile phone 30 or landline phone 54 is routed to the wireless voicemail 28 as depicted in step 202 if the phones are busy or not answered. Specifically, if an incoming call directed to the landline phone is not answered or if the phone is busy, the SSP 52 queries the SCP 24 and receives instructions therefrom to route the call to the wireless voicemail via the MSC 20. If an incoming call directed to the mobile phone is not answered or if the phone is busy, the MSC queries the SCP or HLR and receives instructions to route the call to the wireless voicemail. In either case, the wireless voicemail receives and stores a message from the caller.

Once a message has been stored in the wireless voicemail 28, the voicemail sends an IS-41 TCAP info. directive to the SCP 24 via the STP 22 to inform the SCP of the receipt of the message as depicted in step 204. In response, the SCP sends an info. directive to the HLR 26 via the STP to notify the HLR of the receipt of the voicemail as depicted in step 206. The HLR registers the voicemail notification in the user's profile record and then instructs the MSC 20 via the STP to page the mobile phone 30 as depicted in steps 208 and 210. The paging activates a message waiting indicator on the display of the mobile phone, sends a text message to the mobile phone, or notifies the mobile phone user by any other means that a message has been received and stored in the wireless voicemail.

While the SCP 24 and HLR 26 notify the mobile phone 30 of the receipt of the message, the SCP and SSP 52 also notify the landline phone 54 as depicted in steps 212 through 216. To do so, the SCP first translates or maps the IS-41 TCAP voicemail receipt notification received from the wireless voicemail into SS7 or other AIN protocol as depicted in step 212. The SCP then sends a provision request or trigger invoke to the SSP via the STP 22 as depicted in step 214. The provision request or trigger invoke directs the SSP to notify the user of the landline phone that a message has been received and stored in the wireless voicemail as soon as the user attempts to originate a call from the phone as depicted in step 216. For example, the SSP may stutter the dial tone on the phone when the user takes the phone off-hook or may send a voice message, text display, or other notification that informs the user that a voicemail message has been stored and received. Alternately, the SSP may activate a message waiting notification light on the phone.

The steps illustrated in FIG. 2 are repeated each time a message is received and stored in the wireless voicemail 28 so that a user is notified of the receipt of messages at the mobile phone 30, the landline phone 54 and any other phones operated by the user almost immediately after messages are received and stored. This allows the user to be notified of the receipt of messages regardless of which phone the user is operating and where the user is located.

FIG. 3 broadly illustrates the steps performed when a user retrieves and/or deletes a message from the wireless voicemail 28. The user first accesses the voicemail and retrieves any stored messages as depicted in step 300. The user may do so in a conventional manner by operating the mobile phone 30 to access the voicemail via the MSC 20 or by operating the landline phone 54 to access the voicemail via the SSP 52 and the MSC.

Once the user retrieves and/or deletes all stored messages in the wireless voicemail 28, the voicemail sends a IS-41 TCAP notification to the SCP 24 via the STP 22 to notify the SCP of the retrieval as depicted in step 302. The SCP then sends an info. directive to the HLR 26 via the STP to inform the HLR that the stored messages have been retrieved. In response, the HLR updates the user's profile record and then instructs the MSC 20 via the STP to page the mobile phone as depicted in steps 306 and 308. The page deactivates the message waiting notification that was previously sent to the mobile phone 30 so that the user of the mobile phone is notified that no new messages are stored in the wireless voicemail.

While the SCP 26 and HLR 26 de-activate the message waiting notification on the mobile phone 30, the SCP also notifies the landline phone 58 of the retrieval of the message as depicted in steps 310 through 314. To do so, the SCP first translates or maps the IS-41 TCAP voicemail retrieval notification from the wireless voicemail into SS7 or other AIN protocol as depicted in step 310. The SCP then sends information to the SSP 52 via the STP to update the previously sent provision request as depicted in step 312. Specifically, the SCP instructs the SSP to unprovision the message waiting notification trigger so that the SSP no longer notifies the user that a message has been received and stored in the wireless voicemail when the user operates the phone as depicted in step 314. As a result, the SSP will no longer stutter the dial tone on the phone or provide a voice message, display, or any other notification when the user takes the phone off-hook.

Figure 4:
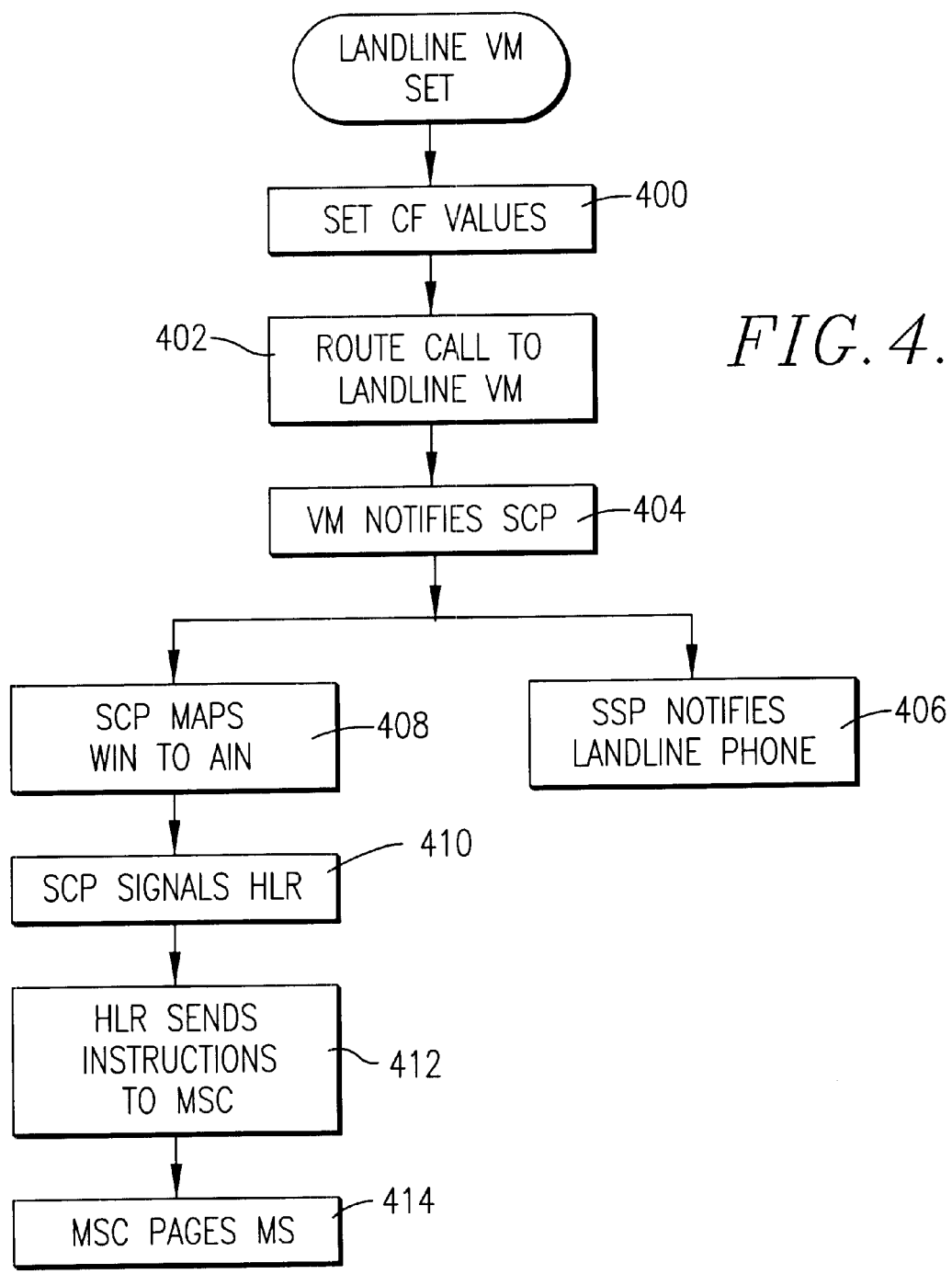
FIG. 4 is a flow diagram broadly illustrating the steps in a preferred embodiment of the present invention to notify a user when a message has been received in the user's landline messaging system.
Figure 5:
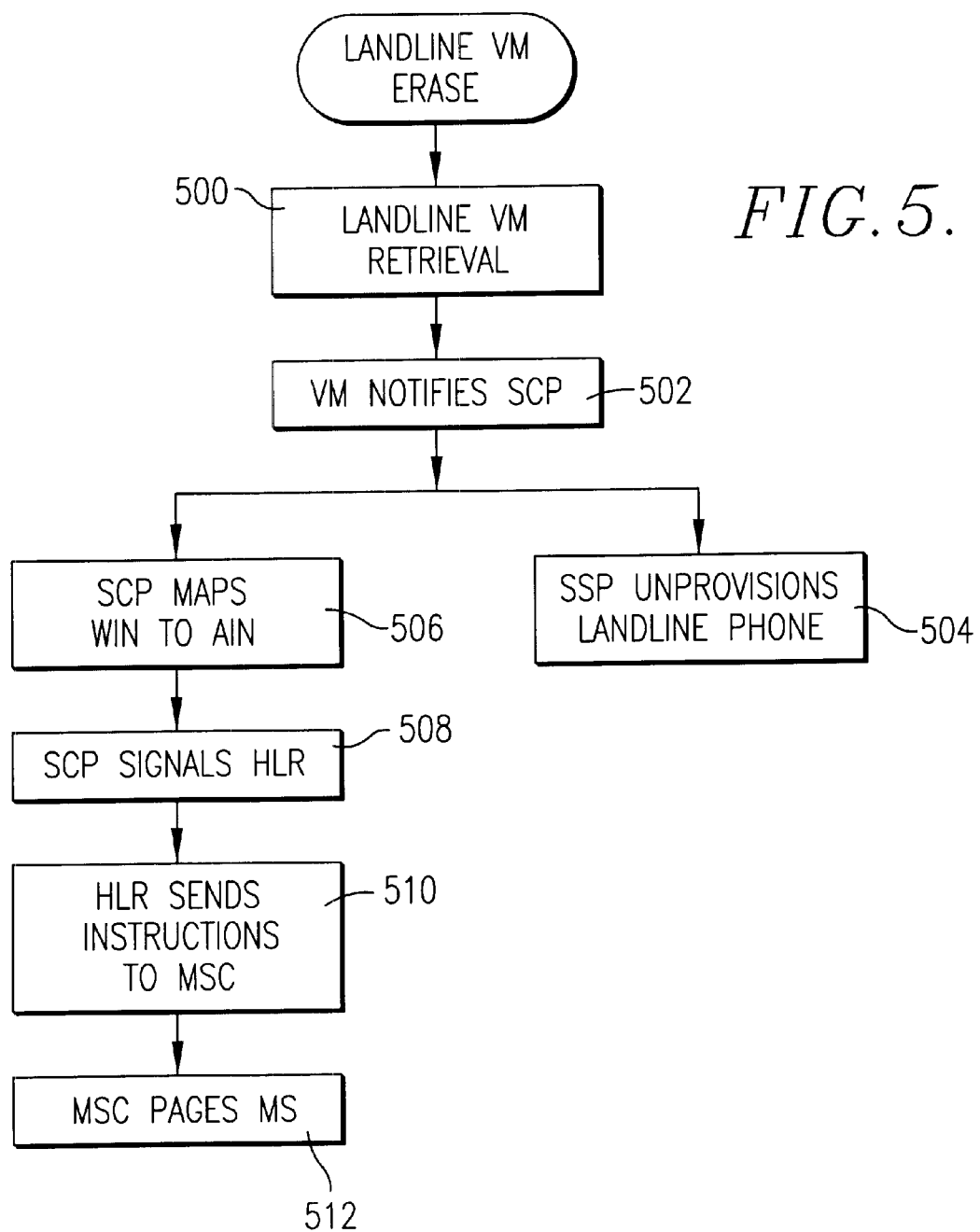
FIG. 5 is a flow diagram broadly illustrating the steps in a preferred embodiment of the present invention to notify a user when a message has been retrieved and/or erased from the user's landline messaging system.

FIGS. 4 and 5 broadly illustrate the steps in a scenario where it is desired to have the landline voicemail 58 receive and store all messages directed to a telephone user at both the user's landline phone 54 and mobile phone 30. To provide message waiting notification for both phones in this scenario, call forwarding (CF) values are first set for the phones as depicted in step 400 of FIG. 4. Specifically, the HLR, SCP or SSP is programmed so that calls directed to the landline phone will be forwarded to the landline voicemail if the landline phone is busy or unanswered after a predetermined number of rings. Similarly, the HLR or WIN SCP is programmed so that all calls directed to the mobile phone will be forwarded to the landline voicemail if the mobile phone is busy or not answered after a predetermined number of rings.

After the call forwarding values have been set, an incoming call directed to the user at either the landline phone 54 or the mobile phone 30 is routed to the landline voicemail 58 as depicted in step 402 if the phones are busy or not answered. Specifically, if an incoming call directed to the landline phone is not answered or if the phone is busy, the SSP 52 queries the SCP 24 and receives instructions to route the call to the landline voicemail. If an incoming call directed to the mobile phone is not answered or if the phone is busy, the MSC 20 sends an info. directive to the SCP 24 or HLR 26 via the STP 22, and the HLR or SCP responds by instructing the MSC to forward the call to the landline voicemail via the SSP.

Once a message has been stored in the landline voicemail 58, the voicemail sends an SS7 or other AIN protocol message to the SCP 24 via the STP 22 to notify the SCP of the receipt of the message in a conventional manner as depicted in step 404. The SCP then sends a provision request or trigger invoke to the SSP 52 to instruct the SSP to notify the user of the landline phone 54 that a message has been received and stored in the voicemail as soon as the user attempts to originate a call from the landline phone as depicted in step 406. For example, as described above, the SSP may stutter the dial tone on the phone or provide a voice message, display, or other notification that informs the user that a voicemail message has been stored and received whenever the user takes the phone off-hook.

While the SCP 24 and SSP 52 notify the landline phone 54 of the receipt of the message, the SCP 24 and other network components also cooperate for notifying the mobile phone 30 of the receipt of the message as depicted in steps 408–414. To do so, the first translates or maps the SS7 or other AIN protocol information delivered by the landline voicemail 58 into IS-41 TCAP protocols as depicted in step 408.

The SCP then sends an info. directive to the HLR 26 via the STP 22 to inform the HLR that a message has been received in the landline voicemail. The HLR registers the notification in the user's profile record and then sends a qual. dir to the MSC 20 to instruct the MSC to page the mobile phone as depicted in steps 412 and 414. The paging preferably activates a message waiting indicator on the display of the mobile phone, sends a text message to the mobile phone or notifies the mobile phone user by any other means that a message has been received and stored in the landline voicemail.

The steps illustrated in FIG. 4 are repeated each time a message is received and stored in the landline voicemail 58 so that a user is notified of the receipt of messages at the landline phone 54, the mobile phone 30, and any other phone the user owns almost immediately after the message is received and stored. This allows the user to be notified of the receipt of a message regardless of which phone the user is currently operating and where the user is located.

FIG. 5 broadly illustrates the steps performed when a user retrieves and/or deletes a message from the landline voicemail 58. The user first accesses the voicemail and retrieves any stored messages as depicted in step 500. The user may do so in a conventional manner by operating the landline phone 54 to access the voicemail via the SSP 52 or by operating the mobile phone 30 to access the voicemail via the MSC 20 and the SSP.

Once the user retrieves and/or deletes all stored messages in the landline voicemail 58, the voicemail sends an SS7 or other AIN protocol message to the SCP 24 via the STP 22 to notify the SCP of the message retrieval as depicted in step 502. The SCP in turn sends a message to the SSP 52 directing the SSP to unprovision the message waiting notification trigger that was previously invoked as depicted in step 504. In response, the SSP no longer notifies the user that a message has been received and stored in the landline voicemail when the user originates a phone call from the landline phone 54.

While the SCP 24 and SSP 52 notify the landline phone 54 of the retrieval of the messages from the landline voicemail 58, the SCP 24 and other network components cooperate for notifying the mobile phone 30 of the message retrieval as depicted in steps 506–512. The SCP first translates or maps the SS7 or other AIN protocol information delivered by the landline voicemail into IS-41 TCAP protocols as depicted in step 506.

The SCP then sends a message to the HLR 26 to notify the HLR of the retrieval of the voicemail as depicted in step 508. In response, the HLR updates the user's profile to indicate the retrieval of the voicemail and then sends paging instructions to the MSC 20 as depicted in step 510. In response, the MSC pages the mobile phone as depicted in step 512 to inform the user of the mobile phone that all messages have been retrieved from the landline voicemail. For example, the page may deactivate the message waiting indicator on the display of the mobile phone or may send a text message indicating that the voicemail is empty.

Although the invention has been described with reference to the preferred embodiment illustrated in the attached drawing figures, it is noted that equivalents may be employed and substitutions made herein without departing from the scope of the invention as recited in the claims. For example, although the method of the present invention has been described and illustrated herein as providing message waiting notification to a user of a wireless network and a landline network, the principles of the invention may be applied to any other networks where messages or other communications are received and stored such as local area networks, wide area networks, intranets and internets. Moreover, although the invention has been described and illustrated herein as providing notification to a user of two networks, the principles of the invention may be used to provide notification to a user of more than two networks. For example, the invention may be used to provide message notification to a user who subscribes to various network services including landline phone services, wireless phone services, e-mail, paging, etc.

Having thus described the preferred embodiment of the invention, what is claimed as new and desired to be protected by Letters Patent includes the following:

1. A method of notifying a user of at least two networks of receipt of a message, each of the networks having a separate messaging system capable of receiving and storing messages thereon, the method comprising the steps of:
   determining which of the separate messaging systems the user elects to use to receive and retrieve messages;
   receiving a communication destined for the user over either one of the networks;
   if the user is unable to receive the communication, routing the communication to the elected messaging system to store thereon a message relating to the communication;
   notifying the user of receipt of the message by sending a message notification to the user over a first one of the networks; and
   notifying the user of the receipt of the message by sending a message notification to the user over a second one of the networks;
   whereby the user is notified of the receipt of the message regardless of which network the user is currently using.

2. The method as set forth in claim 1, the first network comprising a network selected from the group consisting of:

a landline telecommunications network, a wireless telecommunications network, a local area network, a wide area network, an intranet, and an internet.

3. The method as set forth in claim 1, the second network comprising a network selected from the group consisting of: a landline telecommunications network, a wireless telecommunications network, a local area network, a wide area network, an intranet, and an internet.

4. The method as set forth in claim 1, further including the steps of
- receiving a message retrieval request from the user to retrieve the message from the elected messaging system,
- unprovisioning the message notification sent to the user over the first network, and
- unprovisioning the message notification sent to the user over the second network,
- whereby, after the message has been retrieved, the user is no longer notified of the message by either the first or the second network.

5. The method as set forth in claim 4, wherein the message retrieval request is transmitted from the user to the elected messaging system over the first network.

6. The method as set forth in claim 4, wherein the message retrieval request is transmitted from the user to the elected messaging system over the second network.

7. The method as set forth in claim 1, the elected messaging system comprising a voicemail system coupled with the first network.

8. The method as set forth in claim 7, further including the step of forwarding unanswered calls directed to the user over the second network to the voicemail system coupled with the first network.

9. The method as set forth in claim 1, the elected messaging system comprising a voicemail system coupled with the second network.

10. The method as set forth in claim 9, further including the step of forwarding unanswered calls directed to the user over the first network to the voicemail system coupled with the second network.

11. A computer program stored on a computer-readable memory device for notifying a user of at least two networks of receipt of a message for the user, each of the networks having a separate messaging system capable of receiving and storing messages thereon, the computer program comprising:
- a code segment operable for determining which of the separate messaging systems the user elects to use to receive and retrieve messages;
- a code segment operable for routing a communication to the elected messaging system if the user is unable to receive the communication;
- a code segment operable for storing a message corresponding to the communication on the elected messaging system;
- a code segment operable for notifying the user of receipt of the message by sending a message notification to the user over a first one of the networks; and
- a code segment operable for notifying the user of the receipt of the message by sending a message notification to the user over a second one of the networks;
- whereby the user is notified of the receipt of the message regardless of which network the user is currently using.

12. The computer program as set forth in claim 11, the first network comprising a network selected from the group consisting of: a landline telecommunications network, a wireless telecommunications network, a local area network, a wide area network, an intranet, and an internet.

13. The computer program as set forth in claim 11, the second network comprising a network selected from the group consisting of: a landline telecommunications network, a wireless telecommunications network, a local area network, a wide area network, an intranet, and an internet.

14. The computer program as set forth in claim 11, further including
- a code segment operable for receiving a message retrieval request from the user to retrieve the message from the elected messaging system,
- a code segment operable for unprovisioning the message notification sent to the user over the first network, and
- a code segment operable for unprovisioning the message notification sent to the user over the second network,
- whereby, after the message has been retrieved, the user is no longer notified of the message by either the first or the second network.

15. The computer program as set forth in claim 14, wherein the message retrieval request is transmitted from the user to the elected messaging system over the first network.

16. The computer program as set forth in claim 14, wherein the message retrieval request is transmitted from the user to the elected messaging system over the second network.

17. The computer program as set forth in claim 11, the elected messaging system comprising a voicemail system coupled with the first network.

18. The computer program as set forth in claim 17, further including a code segment for forwarding unanswered calls directed to the user over the second network to the voicemail system coupled with the first network.

19. The computer program as set forth in claim 11, the elected messaging system comprising a voicemail system coupled with the second network.

20. The computer program as set forth in claim 19, further including a code segment forwarding unanswered calls directed to the user over the first network to the voicemail system coupled with the second network.

21. A method of notifying a user of a wireless phone network and a landline phone network of receipt of a message, the wireless phone network including a wireless messaging system and the landline network including a landline messaging system, the method comprising the steps of:
- determining which of the wireless and landline messaging systems the user wishes to use to receive and retrieve messages;
- setting call forwarding values for the wireless phone network and the landline phone network to forward all messages destined for the user to the elected messaging system;
- receiving a communication destined for the user over the wireless or the landline network;
- if the user is unable to receive the communication, routing the communication to the elected messaging system to store thereon a message relating to the communication;
- notifying the user of receipt of the message by sending a message notification to the user over the wireless network; and
- notifying the user of the receipt of the message by sending a message notification to the user over the landline network;
- whereby the user is notified of the receipt of the message regardless of which network the user is currently using.

* * * * *